US009765916B2

(12) United States Patent
Cunningham

(10) Patent No.: US 9,765,916 B2
(45) Date of Patent: Sep. 19, 2017

(54) METHOD OF IMPROVING THE LIFE EXPECTANCY OF PIPING

(71) Applicant: Andrew Cunningham, Edmonton (CA)

(72) Inventor: Andrew Cunningham, Edmonton (CA)

( * ) Notice: Subject to any disclaimer, the term of this patent is extended or adjusted under 35 U.S.C. 154(b) by 204 days.

(21) Appl. No.: 14/621,173

(22) Filed: Feb. 12, 2015

(65) Prior Publication Data

US 2016/0215918 A1 Jul. 28, 2016

(30) Foreign Application Priority Data

Jan. 27, 2015 (CA) ..................................... 2880080

(51) Int. Cl.
*F16L 57/06* (2006.01)
*F16L 58/00* (2006.01)
*F16L 9/00* (2006.01)

(52) U.S. Cl.
CPC .............. *F16L 57/06* (2013.01); *F16L 9/006* (2013.01); *F16L 58/00* (2013.01)

(58) Field of Classification Search
CPC . F16L 57/06; F16L 58/00; F16L 58/02; F16L 9/006
See application file for complete search history.

(56) References Cited

U.S. PATENT DOCUMENTS 898,882 A * 9/1908 Hawkins ................ F16L 57/06 285/16
1,237,381 A * 8/1917 Poppenhusen et al. F16L 57/06 285/16
2,105,124 A * 1/1938 Little ...................... F16L 57/06 138/143
2,578,003 A * 12/1951 Garbo .................. B05B 5/1683 406/193
2,776,674 A * 1/1957 Raumaker .............. F16L 57/06 137/236.1
3,451,434 A * 6/1969 Bauer, Jr. ............... F16L 9/006 138/104
4,251,170 A * 2/1981 Sheridan ................ F16L 57/06 138/103
4,935,195 A * 6/1990 Palusamy ............. G01N 17/00 376/249
7,035,777 B2 * 4/2006 Araki ..................... G01N 17/00 703/2
7,089,165 B2 * 8/2006 Araki ..................... G01N 17/00 703/2

(Continued)

FOREIGN PATENT DOCUMENTS

CA 2880080 A1 * 7/2016 .............. F16L 57/06
DE 3911057 A1 * 10/1990 ........... F16L 43/003

(Continued)

*Primary Examiner* — Jason L Vaughan
(74) *Attorney, Agent, or Firm* — Christensen O'Connor Johnson Kindess PLLC

(57) ABSTRACT

A method of improving the life expectancy of piping has steps of determining a circumferential position in the piping having a highest expected rate of wall thickness reduction; determining a circumferential section of a pipe length having a greatest wall thickness; and installing the pipe length in the piping by rotating the pipe length to align the circumferential section of the pipe length having the greatest wall thickness with the circumferential position of the piping having the highest expected rate of wall thickness reduction.

18 Claims, 2 Drawing Sheets

12

12
$t_1$
$t_2$
$t_3$

(56) References Cited

U.S. PATENT DOCUMENTS

| | | | | |
|---|---|---|---|---|
| 7,398,193 | B2 * | 7/2008 | Araki | G01N 17/00 703/2 |
| 7,540,401 | B2 | 6/2009 | Vermaat | |
| 7,713,000 | B2 | 5/2010 | Verkuijl et al. | |
| 8,087,431 | B2 * | 1/2012 | Souza | F16L 3/02 138/103 |
| 8,313,016 | B2 | 11/2012 | Dagenais | |
| 8,931,520 | B2 * | 1/2015 | Fernald | G01F 1/662 138/104 |
| 9,360,139 | B1 * | 6/2016 | Clement | F16L 13/10 |
| 9,464,979 | B2 * | 10/2016 | Clarke | G01N 27/20 |
| 2001/0032064 | A1 * | 10/2001 | Araki | G01N 17/00 703/6 |
| 2005/0081936 | A1 * | 4/2005 | Wilmeth | F16L 57/06 138/143 |
| 2005/0149305 | A1 * | 7/2005 | Araki | G01N 17/00 703/9 |
| 2006/0229855 | A1 * | 10/2006 | Araki | G01N 17/00 703/9 |
| 2009/0212024 | A1 | 8/2009 | Muller et al. | |
| 2010/0294389 | A1 * | 11/2010 | Souza | F16L 3/02 138/110 |
| 2011/0036439 | A1 * | 2/2011 | Fernald | G01F 1/662 138/104 |
| 2011/0067497 | A1 * | 3/2011 | Grubb | G01N 29/043 73/623 |
| 2011/0316271 | A1 | 12/2011 | Lalam | |
| 2012/0174372 | A1 | 7/2012 | Dagenais | |
| 2014/0354307 | A1 * | 12/2014 | Clarke | G01N 17/04 324/700 |
| 2014/0366975 | A1 * | 12/2014 | Allison | F17D 5/06 138/36 |
| 2015/0233710 | A1 * | 8/2015 | Simonetti | G01B 17/02 73/633 |
| 2016/0215918 | A1 * | 7/2016 | Cunningham | F16L 57/06 |
| 2016/0290974 | A1 * | 10/2016 | Coleman | G01N 29/04 |
| 2016/0320219 | A1 * | 11/2016 | Hellevang | G01F 1/662 |

FOREIGN PATENT DOCUMENTS

| | | | | |
|---|---|---|---|---|
| DE | WO 2010130243 | A1 * | 11/2010 | F16L 43/001 |
| JP | 06279810 | A * | 10/1994 | |
| JP | 2001-9590 | A | 1/2001 | |
| JP | 2010122075 | A * | 6/2010 | |
| KR | 10-0809535 | B1 | 3/2008 | |
| RU | 2 169 654 | C1 | 6/2001 | |

* cited by examiner

METHOD OF IMPROVING THE LIFE EXPECTANCY OF PIPING

TECHNICAL FIELD

This relates to a method of improving the life expectancy of piping, such as by enhancing the piping's resistance with respect to deterioration of the sidewall, such as by corrosion.

BACKGROUND

Piping is commonly used to transport fluids, which may include fluids in a gas phase, liquid phase, or mixed phases, such as gas and liquid mixtures, slurries, or fluidized solids. As the types of product and substances that can be transported by piping are well known, the term fluid will be used to generally indicate anything that may be transported by piping. In transporting these fluids, the integrity of the piping must be monitored to ensure safe operation and to prevent spills or accidents, particularly when transporting harmful or dangerous substances. One common source of failure in piping is corrosion, although the life expectancy of piping may also be affected by other factors. Depending on the circumstances of use and the products being transported, piping may corrode in different locations and for different reasons. For example, the inside bottom surface of piping may corrode if heavy component settle out and accumulate on the bottom, the top internal surface of piping may corrode due to water vapour that may exist above the fluid in the piping, and the outside top surface may corrode as the insulation collects condensation from the air. There may be other causes for corrosion in various parts of the piping and other reasons for a reduction in the integrity of a piping circuit, such as by erosion caused by abrasive materials, as is known in the art.

SUMMARY

According to an aspect, there is provided a method of improving the life expectancy of piping. The method comprises the steps of: determining a circumferential position in the piping having a highest expected rate of wall thickness reduction; determining a circumferential section of a pipe length having a greatest wall thickness; and installing the pipe length in the piping by rotating the pipe length to align the circumferential section of the pipe length having the greatest wall thickness with the circumferential position of the piping having the highest expected rate of wall thickness reduction.

In other aspects, the method may include one or more of the following features: determining the circumferential position having the highest expected rate of wall thickness reduction comprises reviewing a historical trend of wall thickness reduction in the piping; determining the circumferential position having the highest expected rate of wall thickness reduction comprises identifying the type of material of the piping, the fluid to be transported in the piping and an operating temperature range of the piping; the wall thickness reduction is caused at least in part by corrosion, erosion, or both; and the steps are repeated for a plurality of longitudinal positions along the piping.

According to an aspect, there is provided a method of improving the life expectancy of piping installed along a transport path. The method comprises the steps of: at a plurality of locations along the transport path, predicting a wall thickness reduction rate at a plurality of circumferential positions for piping to be installed; measuring a wall thickness at a plurality of circumferential positions of each of a plurality of pipe sections to determine variations in the wall thickness in each pipe section; determining a radial orientation of the pipe sections at a plurality of locations along the transport path to improve the life expectancy of the pipe sections based on the measured wall thickness of the pipe section and the predicted wall thickness reduction rate of the piping to be installed; and installing the pipe sections along the transport path.

In other aspects, the method may include one or more of the following features: characterizing the transport path comprises reviewing a historical trend of wall thickness reduction in piping positioned along the transport path; predicting a wall thickness reduction rate comprises identifying the type of material of the piping, the fluid to be transported in the piping and an operating temperature range of the piping; the wall thickness reduction is caused at least in part by corrosion, erosion, or both; and determining the radial orientation to improve the life expectancy of each pipe section comprises aligning the circumferential portion of the piping section with the greatest wall thickness and the circumferential position of the piping with the highest predicted wall thickness reduction rate.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
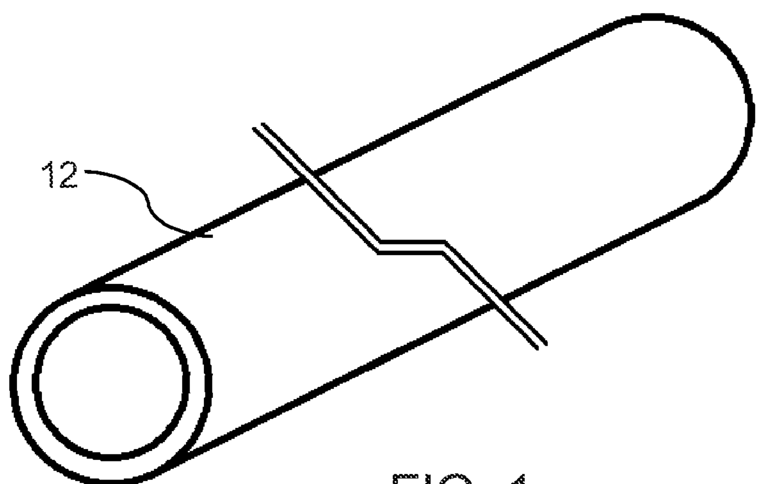
FIG. 1 is a perspective view of a pipe length.
Figure 2:
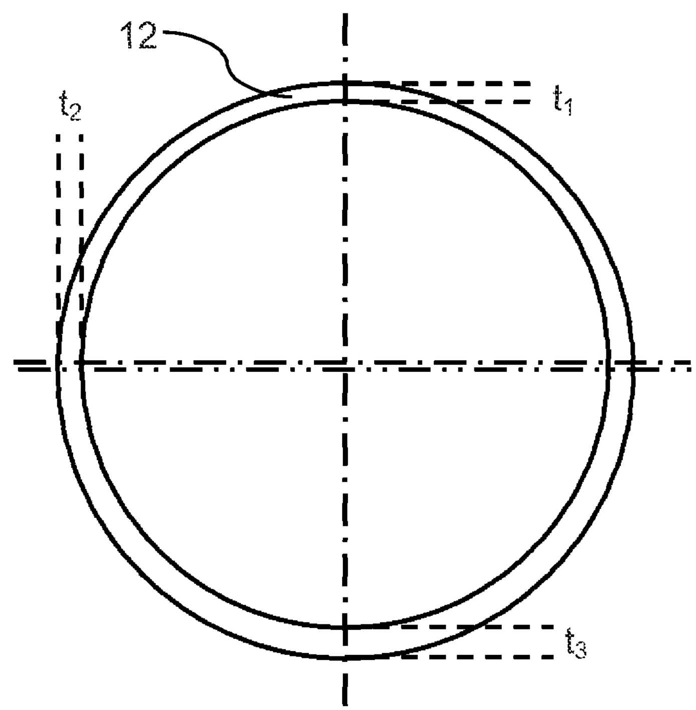
FIG. 2 is an end view of a pipe length.

A method of improving the life expectancy of piping will now be described with reference to FIGS. 1 through 3. As discussed herein, the life expectancy relates to wall thickness reduction, such as may occur as a result of corrosion, erosion, or both. As the primary source of wall thickness reduction in most piping is due to corrosion, the discussion below is primarily in the context of corrosion.

Figure 3:
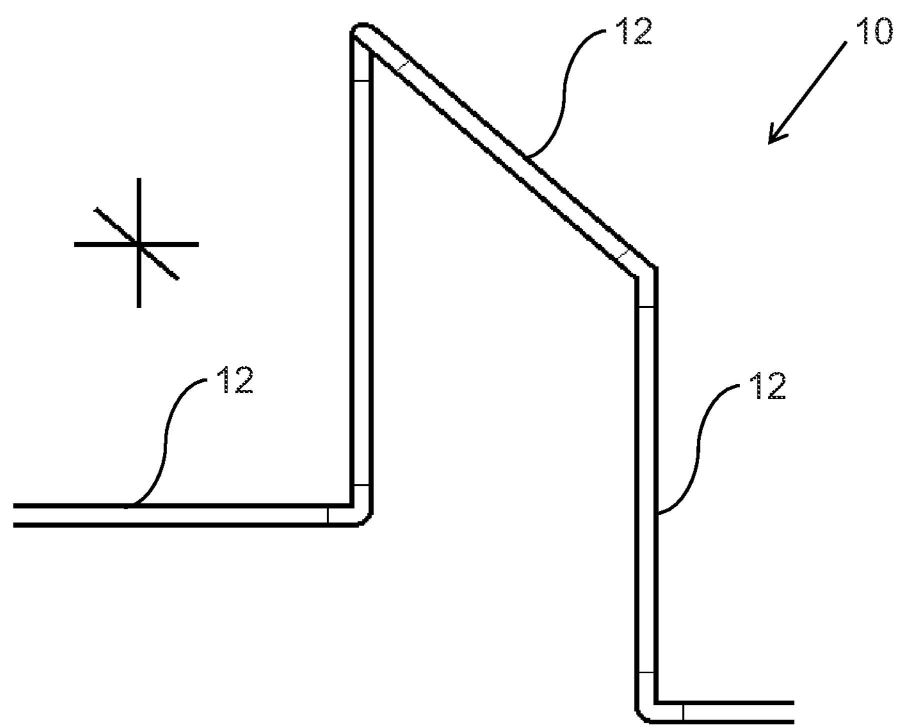
FIG. 3 is a top plan view of a piping circuit.

Referring to FIG. 3, there is shown a piping 10 installed along a transport path, such as in a piping circuit. The method described herein may be used for piping 10 that is pre-existing and is being repaired or replaced, or may be used for a new piping installation. Accordingly, the transport path discussed herein is the intended path for transporting fluid through the piping, and may be the path of a previously installed piping that is being repaired or replaced, or may be the intended path of a piping circuit to be installed. In addition, the method may also be used for piping spools, and various fittings, such as tees, elbows, reducers, etc.

The method described herein relates to improving the life expectancy of piping 10 by matching the deterioration characteristics of piping 10 with variations in the thickness of pipe lengths 12. This method is primarily applicable to enhancing the structural integrity of the sidewall of pipes, or enhancing the life-expectancy of pipes by increasing their minimizing the effects of corrosion. In particular, a common reason for a reduction in the structural integrity of piping is corrosion in metal pipe lengths made from, for example, carbon steel or other metals and alloys that are susceptible to corrosion, which is a common cause of piping failure. It will be understood that there are other effects that reduce structural integrity, such as wear due to abrasive materials, and that these effects may occur in pipes made from other materials aside from metal, or in metal pipes that are highly resistant to corrosion.

Pipe lengths are manufactured to a desired inner and outer diameter. The goal is to produce lengths of pipe with consistent wall thicknesses at the specified inner and outer diameters, however manufacturing processes generally result in some departure from the ideal standards due to limitations in the accuracy of the manufacturing equipment, variations in the stock materials, etc. While it is possible with modern manufacturing techniques to achieve a high degree of accuracy, this increases the manufacturing costs and is not always necessary. Instead, more cost effective manufacturing techniques by accepting that there will be some variation in the final product. As such, piping is manufactured to within specified tolerances, which set out the amount of variation permissible from, for example, the inner diameter, the outer diameter, the radius of curvature, etc. These tolerances are generally chosen based on cost considerations and the intended use of the lengths of pipe. As a result, manufactured pipe lengths often have wall thicknesses that vary around the circumference of the pipe. It can generally be assumed that the wall thickness will be consistent along the length of the pipe, or consistent within a small margin, such that the wall thickness e.g., $t_1$, $t_2$, $t_3$, measured at one end can be used as the approximate thickness along the length of the pipe and to determine whether a length of pipe falls within the tolerances. This assumption is present in the discussion below, although it may not be true in all circumstances. If a more accurate approach is desired, techniques may be used to measure the wall thickness of the pipe along its length. In most cases, it is believed that this additional measurement would not yield cost effective results in most circumstances.

As mentioned above, the degree of accuracy when manufacturing pipe lengths is better when using some manufacturing techniques than others. For example, higher variations in wall thickness would be expected in a length of metal pipe that uses a die in its manufacturing process, whereas a length of metal pipe that is manufactured by rolling a metal plate to form a tube, or by machining would be expected to have more consistent dimensions and a more consistent wall thickness. When using pipe manufactured with looser tolerances, it has generally been necessary to predict the life expectancy that accounts for the thinnest possible wall. However, the present method uses the inherent variations in wall thickness to increase the life expectancy of a piping, which allows pipe lengths produced using less expensive and less accurate production techniques to increase the life expectancy of the piping. Generally, the principles described herein are particularly applicable to extruded or seamless pipe that is commonly used as process piping.

When installing a piping along a transport path, the corrosion rate of the transport path along which a piping will transport fluid may be predicted. The corrosion rate prediction will include at least an identification of which circumferential portion of the piping will be subject to the greatest amount of corrosion, and which would be expected to fail the soonest. While it may be necessary to predict a corrosion rate along the entire length of the transport path, which may or may not vary along the length of the transport path, it may only be necessary to predict the corrosion rate for particular sections of the piping that are of particular concern, either because of a high corrosion rate, or because enhanced protection is desired for a particular section. For example, the method may be used on portions of a transport path that are located in areas that are particularly difficult to service or monitor, or that traverse more sensitive environments. In the steps described herein, it is assumed that, unless otherwise specified, reference to a transport path or piping refers to a particular length under consideration, which may or may not include the entire length of the production path or piping.

In predicting the corrosion rate, there may be some benefit to predicting an absolute rate of corrosion. However, at a minimum, the predicted corrosion rate should include a relative rate of corrosion between two or more circumferential sections of the piping, and may be merely identifying a circumferential portion that is the most likely to corrode and/or erode relative to the other circumferential portions of the piping. The term “circumferential section” or “circumferential portion” will be understood to refer to a section of the sidewall of the pipe or piping in cross-section, i.e., a portion that is measured along the radius of the pipe rather than along its axis. The circumferential section or portion may be defined by where corrosion is found or not found, such as by identifying the centre of an affected area and moving outward on either side to a set or desired distance, or by identifying the edges of an affected area and identifying the space between the edges as the circumferential section. The identification of more than one circumferential section may include identifying which circumferential portion of the piping is likely to corrode at a higher rate, and the remaining portion of the piping is identified as likely to corrode at a lower rate. In many cases, corrosion occurs more often on either the top of the piping or on the bottom, and may be inside the pipe or outside the pipe.

Identifying the corrosion rate may be accomplished by either identifying characteristics of the piping circuit that are indicative of a particular type of corrosion, or, if the piping is pre-existing, by reviewing the historical trends of corrosion in the piping, including the circumferential position of the corrosion. For example, predicting corrosion may include reviewing records, such as data, test results or the like that relate to corrosion and either indicate or are suggestive of the rate and type of corrosion that has occurred in a particular section of piping and in a particular circumferential portion. In one example, the location and possibly the amount of corrosion may be observed and recorded in a section of pipe that is being replaced. In another example, logs or records from inspections that are regularly performed in piping may be used to determine the likely circumferential section where corrosion is most likely to occur, and possibly the rate of corrosion that is expected. While reviewing records, it may be necessary to account for variations in the wall thickness of the pipe previously installed, which may have been installed without regard to wall thickness variations and which may affect the apparent life expectancy of a piping section due to the orientation of the piping when installed, and which may have unintentionally aligned a thinner or thicker wall with the circumferential portion being corroded.

Another method of predicting a corrosion rate may include a consideration of the various characteristics of the transport path and the piping to be installed, such as the type of material used in the piping, the type and composition of fluid being transported, the expected operating range of fluids being transported, the expected range of environmental temperatures, and the like. For example, the weight of the component that causes corrosion in the fluid being transported will often predict whether corrosion occurs at the top or bottom of piping. There may be other factors known in the art that may be considered when predicting a corrosion rate, or identifying a portion that is more likely to corrode at a higher rate than the rest of the pipe.

Another possible source of corrosion may be the point at which alkaline or acid fluids are injected into the pipeline, such as to control the pH in the pipeline. While the additive will eventually mix in with the pipeline fluids, at the point at which they are injected they may corrode the pipeline walls. The corrosion may occur, for example, on a wall opposite the injection port. Accordingly, the pipe may be oriented with the thicker section of the sidewall to accommodate the corrosion.

As noted previously, it is reasonable to assume that any variations in wall thickness around the circumference of the length of pipe will be consistent along the entire length of a length of pipe. While variations in the thickness of the pipe may be accounted for if desired, this is generally seen as not being cost effective in most circumstances. Furthermore, when predicting the rate of corrosion, it may not be necessary to do so at intervals less than the lengths of the pipe to be installed. As the type of corrosion may be consistent along a piping or a section of the piping being considered, a single prediction may be sufficient. In other words, the method may include an assumption that the entire length of piping under consideration will be subject to a particular type of corrosion and at a particular circumferential position in the piping.

Once the wall thickness of the pipe has been measured and the corrosion in the transport path of the piping has been characterized, the radial orientation of the pipe sections may be determined to improve the life expectancy of the pipe sections as it relates to corrosion. This is done based on the measured wall thickness of the pipe section and the predicted corrosion rate of the piping to be installed, and will generally result in the circumferential portion of the pipe section with the greatest wall thickness being aligned with the circumferential position of the piping with the highest predicted corrosion rate.

In addition to corrosion, properly aligning pipe sections may also result in a more consistent flow through piping by aligning wall thicknesses such that the inner surfaces are properly aligned. Doing so reduces internal resistance to flow and generates fewer or weaker eddy currents and results in a more stable system, fewer problems from flow resistance and eddy currents, and a reduced load on pumps.

In order to achieve maximum benefit, it may be necessary to pre-measure some or all lengths of pipe and plan the order in which pipe lengths will be installed in the piping. For example, in a section of a piping that is particularly prone to corrosion, it may be beneficial to install pipe lengths with a particularly large variation in the wall thickness, whereas in other sections, lengths of piping with a more consistent wall thickness may be used, either to reserve the lengths of piping with higher variation to those sections with a higher difference in corrosion rates, or because a particular section is subject to more uniform corrosion. Other factors may also be taken into account when planning the order of installation for pipe lengths.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A method of improving the life expectancy of piping, the method comprising the steps of:

obtaining pipe lengths manufactured using a process that produces a uniform wall thickness within a predetermined tolerance such that the wall thickness of the pipe lengths has a random distribution within the predetermined tolerance;

determining a circumferential position in the piping having a highest expected rate of wall thickness reduction;

determining a circumferential section of a plurality of pipe lengths having a greatest wall thickness; and installing the plurality of pipe lengths in the piping by rotating respective pipe lengths to align the circumferential section of the respective pipe lengths having the greatest wall thickness with the circumferential position of the piping having the highest expected rate of wall thickness reduction.

2. The method of claim 1, wherein determining the circumferential position having the highest expected rate of wall thickness reduction comprises reviewing a historical trend of wall thickness reduction in the piping.

3. The method of claim 1, wherein determining the circumferential position having the highest expected rate of wall thickness reduction comprises identifying the type of material of the piping, the fluid to be transported in the piping and an operating temperature range of the piping.

4. The method of claim 1, wherein the steps are repeated for a plurality of longitudinal positions along the piping.

5. The method of claim 1, wherein the wall thickness reduction rate is caused at least in part by corrosion.

6. The method of claim 1, wherein the wall thickness reduction rate is caused at least in part by erosion.

7. The method of claim 1, wherein the piping is non-machined piping.

8. The method of claim 1, wherein the piping is manufactured by extrusion or forging.

9. The method of claim 1, wherein determining the circumferential section having the greatest wall thickness comprises measuring the wall thickness with a measurement device.

10. A method of improving the life expectancy of piping installed along a transport path, the method comprising the steps of:

obtaining pipe lengths manufactured using a process that produces a uniform wall thickness within a predetermined tolerance such that the wall thickness of the pipe lengths has a random distribution within the predetermined tolerance;

at a plurality of locations along the transport path, predicting a wall thickness reduction rate at a plurality of circumferential positions for piping to be installed;

measuring a wall thickness at a plurality of circumferential positions of each of a plurality of pipe lengths to determine variations in the wall thickness in each pipe length;

determining a radial orientation of the pipe lengths at a plurality of locations along the transport path to improve the life expectancy of the pipe lengths based on the measured wall thickness of the pipe length and the predicted wall thickness reduction rate of the piping to be installed; and installing the pipe lengths along the transport path in the determined radial orientations.

11. The method of claim 10, wherein determining the radial orientation of the pipe lengths at a plurality of locations along the transport path comprises reviewing a historical trend of wall thickness reduction in piping positioned along the transport path.

12. The method of claim 10, wherein predicting a wall thickness reduction rate comprises identifying the type of material of the piping, the fluid to be transported in the piping and an operating temperature range of the piping.

13. The method of claim 10, wherein determining the radial orientation to improve the life expectancy of each pipe length comprises aligning the circumferential portion of the pipe length with the greatest wall thickness and the circumferential position of the piping with the highest predicted wall thickness reduction rate.

14. The method of claim 10, wherein the wall thickness reduction rate is caused at least in part by corrosion.

15. The method of claim 10, wherein the wall thickness reduction rate is caused at least in part by erosion.

16. The method of claim 10, wherein the piping is non-machined piping.

17. The method of claim 10, wherein the piping is manufactured by extrusion or forging.

18. The method of claim 10, wherein wall thickness is measured using a measurement device.

* * * * *